May 2, 1933.  R. SCHIEBEL  1,906,423
THERMOMETER
Filed June 23, 1930
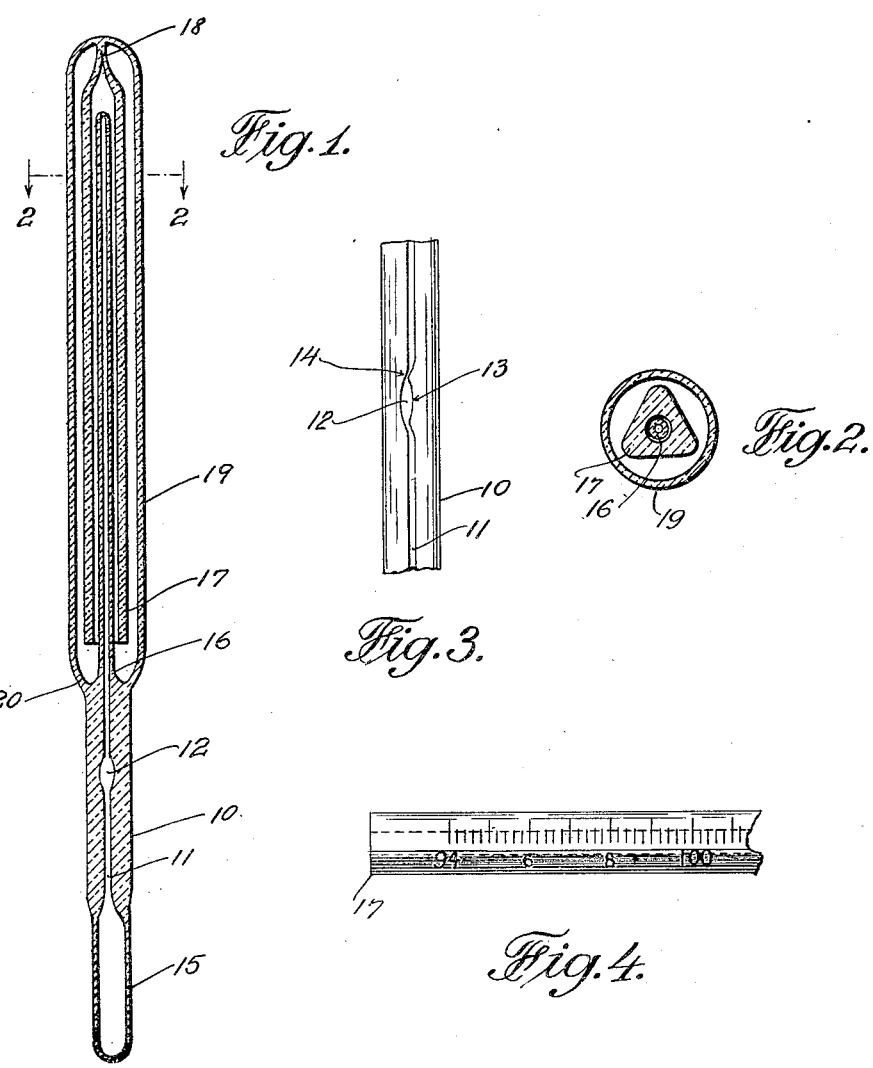
INVENTOR
Reinhold Schiebel
BY
ATTORNEY Patented May 2, 1933

1,906,423

UNITED STATES PATENT OFFICE

REINHOLD SCHIEBEL, OF RICHMOND HILL, NEW YORK

THERMOMETER

Application filed June 23, 1930. Serial No. 462,959.

The present invention relates to thermometers in general, and particularly to an aseptic clincal thermometer, and the process of manufacturing the same.

One of the objects of this invention is to provide an instrument which has none of the disadvantages of the present clinical thermometers, namely the "slipping" of the mercury column, after the temperature of a patient is taken, and outer scale markings which, after even a short time of use, become obliterated and afford resting places for infectious germs.

Another object of my invention is to provide, in a clinical thermometer, an individual and separately prepared mercury return flow stop member, which forms the working base member to which the other parts of the thermometer are attached.

Another object of my invention is to provide a hollow, magnifying scale member, in the form of a sleeve, enclosing the mercury tube and a protective cylinder adapted to cover both the scale member and the mercury tube and joined to the individual stop member.

A further object of my invention is the method or process for associating the several parts of the thermometer so as to form an aseptic instrument in which the mercury column is prevented from "slipping" after the temperature of a patient has been taken.

The foregoing and further objects of my invention will be more fully apparent from the following description and the accompanying drawing, forming part of my disclosure, but by no means intended to limit same to the actual showing, and in which Figure 1 is a longitudinal cross-sectional view through a preferred form of my thermometer;

Figure 2 is an enlarged transverse cross-sectional view taken on line 2—2 of Figure 1;

Figure 3 is an enlarged side elevation of the mercury return flow stop member, and Figure 4 is an enlarged front elevation of a portion of my hollow magnifying scale member.

Referring to the drawing, numeral 10 denotes the individual, separately prepared mercury return flow stop member, hereinafter referred to as "stop member", which consists of a relatively heavy-walled cylinder provided with a through passage 11. At about the center of the passage, a bubble 12 is blown, one wall 13 of which is brought back into substantial alignment with passage 11, as will be clearly seen from Figure 3.

Where the bubble joins with the passage 11, particularly at the upper end of the bubble, it will be seen that the passage is considerably reduced, as indicated at 14. This reduction of area in the passage permits the expanding mercury to travel in upward direction without difficulty, however, it prevents the mercury column from "slipping" in downward direction, thereby causing it to remain at the highest position reached during the taking of temperatures.

This feature is of utmost importance in a clinical thermometer, and unless the stoppage of the mercury column is absolutely positive, the reading of the instrument becomes inaccurate, which may result in serious consequences. It is therefore necessary to produce a reliably working, dependable stop member in order to make a clinical thermometer a useful instrument.

In the manufacture of clinical thermometers by methods used heretofore, it was found rather difficult to form a positively working stop member, since the heating of the thermometer material during its manufacture, distorted the all important passage reduction. In consequence thereof, a rather large percentage of clinical thermometers do no reach the required standard and are rejected.

The formation of an individual stop member is therefore of great advantage in that this member may be accurately finished and tested, and, if found correct, joined with the other parts comprising the instrument without affecting its structure. This is accomplished by employing relatively thick-walled material of sufficient length, so that the ends to which the other parts are to be joined are adequately distanced from the bubble 12. This precludes any changes in the shape of the bubble, and in the reduction 14, which may be caused by heat employed in joining the thermometer parts to the stop member.

Referring to Figure 1, it will be clearly seen that a mercury bulb 15 is associated with the lower end of stop member 10, while at its upper end there will be observed a mercury tube 16 which is so associated with the stop member, that its mercury passage registers with that of the latter.

Extending over and completely surrounding the mercury tube, a magnifying hollow scale member 17 is seen, the lower end of which is free, while its upper end is joined at 18 with outer or covering cylinder 19. The triangularly shaped scale member has rounded-off cylindrically shaped corners serving as a magnifying glass for the mercury column within the tube 16 and adapted to center the scale member relative to its outer covering. On its two sides, a calibration and numerals are provided, as may be clearly observed from Figure 4.

Cylinder 19 forms an enclosure for both the mercury tube 16 and the scale member 17 and is joined at its lower end 20 with the upper end of stop member 10. From the cross-sectional view shown in Figure 2, the arrangement of the respective thermometer parts will be clearly understood.

The process of manufacture

To start with, the stop member is provided first in the manner explained previously, whereafter the mercury bulb 15 is attached thereto. The next operation consists of joining the mercury tube 16 with the stop member and filling the thus formed receptacle with mercury and sealing of tube 16. Then cylinder 19 is associated with stop member 10, at 20, and the low and high position of the mercury column are ascertained and indicated upon the cylinder.

Following this operation, the scale member 17 is graduated in accordance with the marks made upon the cylinder and slipped over mercury tube 16 and into cylinder 19, and set into proper position corresponding to the cylinder markings. When thus fixed, the scale member and the cylinder are fused and sealed at the top.

From the foregoing, it will be clearly evident that by providing a separate stop member in the manner outlined and in associating it, after tests, with the other parts of the thermometer, in the order stated, I not only produce a perfect device of its kind but eliminate what is known as "rejects".

Through the placement of a scale member into a cylinder, and by sealing it therewithin, the instrument becomes aseptic and the scale and its markings cannot only not be obliterated but also prevent any possibility for germs to associate themselves with any part of the instrument.

While I have described my invention in detail and in respect to the drawing showing a preferred form of my device, be it understood that changes in design and in the manufacture may be made without departing from the broad scope of my invention, for which I claim:

1. An aseptic clinical thermometer, comprising, in combination, a mercury bulb, a mercury return flow stop member associated therewith at one of its ends and comprising a relatively short thick-walled tubing containing a mercury stop in the form of a mercury-passage reduction, adjacent enlargement, and another reduction of the mercury passage in the thick-walled tubing, a relatively thin-walled tubing associated with the other end of the return flow stop member, its mercury passage registering with that of the stop member and serving to accommodate a mercury column, a scale member in the form of a multiple edged sleeve surrounding said thin-walled tubing, and having a plurality of magnifying surfaces extending over substantially the entire length of said thin-walled tubing, a covering or enclosing cylinder surrounding said scale member and associated therewith at one end while the other end connects with said stop member.

2. In an aseptic clinical thermometer, the combination with an individual mercury return flow stop member, of a mercury bulb connected with the lower end thereof, a mercury tube connected with the upper end thereof, a magnifying multiple edged hollow scale member of substantially triangular cross section surrounding said tube, a covering cylinder surrounding said scale member and associated at its lower end with the upper end of said stop member, said scale member associated with and suspended by the upper end of said cylinder, the edges of said scale member having cylindrical surfaces adapted to magnify the mercury column in said mercury tube.

3. An aseptic clinical thermometer, comprising in combination, a mercury bulb, a mercury return flow stop member associated therewith at one of its ends, a relatively thin-walled tubing associated with the other end of the return flow stop member, its mercury passage registering with that of the stop member and serving to accommodate a mercury column, a magnifying scale member of substantially triangular cross section in the form of a sleeve surrounding said thin-walled tubing, a covering or enclosing cylinder surrounding said scale member and associated therewith at one end, while the other end connects with said stop member.

In testimony whereof I affix my signature.

REINHOLD SCHIEBEL.